March 27, 1934.  C. G. SUITS  1,952,186
VARIABLE PULSATION APPARATUS
Filed Oct. 1, 1932
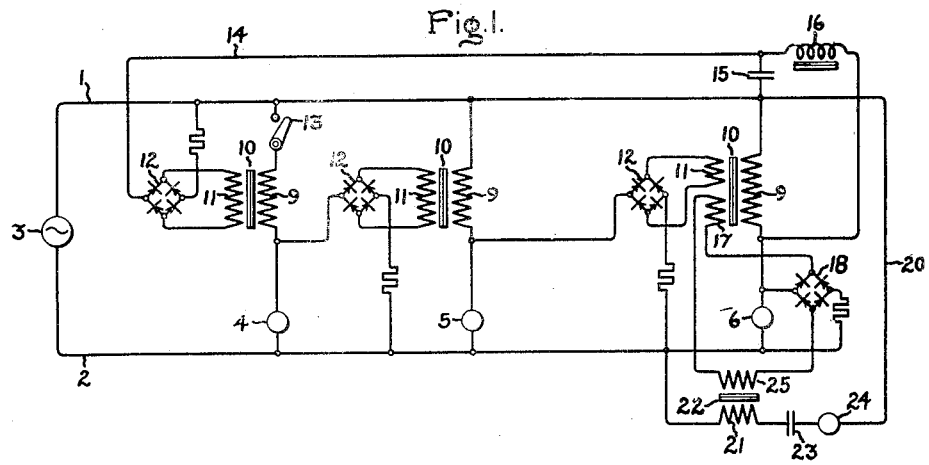
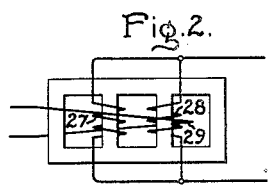
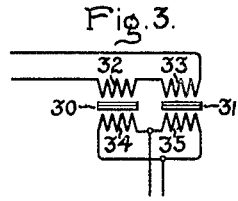
Inventor:
Chauncey G. Suits,
by Charles E. Mullen
His Attorney.

Patented Mar. 27, 1934

1,952,186

UNITED STATES PATENT OFFICE 1,952,186

VARIABLE PULSATION APPARATUS

Chauncey G. Suits, Schenectady, N. Y., assignor to General Electric Company, a corporation of New York Application October 1, 1932, Serial No. 635,782

11 Claims. (Cl. 171—97)

My invention relates to alternating current apparatus for producing pulsations, particularly those of relatively low frequency. In certain aspects, my invention is a further development of what I have disclosed in my copending applications, Serial No. 510,750 filed Jan. 23, 1931; Serial No. 582,801 filed Dec. 31, 1932; and Serial No. 601,197 filed March 25, 1932, all assigned to the same assignee as my present application.

One object of my invention is the provision of improved alternating current pulsation apparatus wherein the frequency of the pulsations is varied. Another object of my invention is the provision of such apparatus wherein the amplitude of the pulsation is varied. A further object of my invention is the provision of such apparatus including a plurality of pulsation circuits the pulsation frequency of one being variable and controlled by another. A still further object of my invention is the provision of such apparatus including a plurality of pulsation circuits the pulsation amplitude of one being variable and controlled by the other.

My invention will be better understood from the following description taken in connection with the accompanying drawing, and its scope will be pointed out in the appended claims.

In the drawing Fig. 1 is a circuit diagram illustrating one embodiment of my invention; Figs. 2 and 3 illustrate details thereof.

In Fig. 1 of the drawing, an alternating current supply circuit is shown at 1 and 2 which may be connected with any suitable source of alternating current illustrated at 3, which for example may be a 110 volt, 60 cycle source. Connected across the supply circuit 1 and 2 is a series of branch circuits each containing a load device such as an incandescent lamp represented at 4, 5, and 6. Such load devices may, for example, be beacon or field border lamps at an airport, the lamps of an electric sign or fountain or any other load device which it is desired to have operate in a certain sequence. In each branch circuit and in series with the load device of that circuit is the alternating current winding 9 of the saturable core reactor 10 having a direct current saturating winding 11. The winding 11 of each of these reactors is with the exception of the reactor in the first branch circuit shown connected across the lamp of the preceding branch through a full wave rectifier which may be of well known construction and is represented at 12. In the first branch circuit of the series is the starting switch 13. The rectifier 12 associated with the reactor of the first branch circuit has one terminal connected through a resistor with the supply line 1 and the other terminal connected through conductor 14 with the same supply line 1 through the capacitor 15. This capacitor, together with the saturable core reactor 16, forms a non-linear resonant circuit which connects across the winding 9 of the reactor 10 in the last branch circuit. Such an arrangement is disclosed and claimed in my co-pending application, S. N. 544,311, filed June 15, 1931. Reactor 10 has a second saturating winding 17 which is connected across lamp 6 through the full wave rectifier 18 which may be similar to rectifiers 12.

At 20 I have shown a non-linear resonant pulsating circuit the frequency and amplitude of the pulsations of which are variable. This pulsation circuit includes the alternating current winding 21 of the saturable core reactor 22, the capacitor 23 and the load device 24, which for example may be an incandescent lamp similar to lamps 4, 5, and 6. The direct current saturating winding 25 of reactor 22 is included in series with the saturating winding 17. The frequency and amplitude of the alternating current pulsations in circuit 20 are dependent upon the degree of saturation of the reactor 22 hence as the saturating current of this reactor varies the pulsations in circuit 20 vary both in frequency and amplitude.

The operation of the apparatus will now be described. Assuming the switch 13 in the first branch circuit to be open, lamp 4 will be extinguished because it is on an open circuit, and lamps 5 and 6 will each be extinguished or burning dimly since the respective reactors in circuit therewith are unsaturated, and hence have a maximum impedance. Lamp 24 is also extinguished or dimmed since reactor 22 in circuit therewith being unsaturated has a maximum impedance. The resonant circuit including capacitor 15 and reactor 16 is so constructed that when lamp 6 is extinguished or burning dimly the voltage supplied to this circuit by winding 9 causes the circuit to become resonant. The resulting voltage across capacitor 15 supplied to the saturating winding 11 of the first branch of the circuit is sufficient to saturate the reactor 10 of this branch circuit. The impedance offered by winding 9 of this branch circuit hence is low so that when the switch 13 is closed lamp 4 becomes illuminated. Current is now supplied to the saturating winding 11 of the second branch circuit which in turn and with a time delay decreases the impedance of the winding 9 in the second branch circuit whence lamp 5 is illuminated. In a similar manner the impedance of the winding 9 of the last branch circuit subsequently is lowered and the lamp 6 is partially illuminated. The resulting increase in resistance drop across lamp 6 causes saturating current to be supplied through rectifier 18 to the winding 17 which produces still greater saturation of the reactor in the last branch circuit. This also produces a greater time delay in the illumination of lamp 6 which finally reaches full brilliancy. The decrease in impedance of winding 9 of the last branch, however, decreases the voltage supplied by the resonant circuit comprising capacitor 15 and reactor 16 causing this circuit to be detuned or become dissonant. As a result the saturating current supplied by capacitor 15 over conductor 14 to the reactor of the first branch circuit is decreased causing the winding 9 of the reactor in the first branch circuit to have its impedance increased sufficient to extinguish lamp 4. The resistance drop across lamp 4 being thereby decreased less saturating current is supplied to the reactor of the second branch circuit and lamp 5 is extinguished. Likewise, lamp 6 in the last branch circuit is partially extinguished. As a result less saturating current is supplied to the saturating winding 17 and lamp 6 is further reduced. The resonant circuit comprising capacitor 15 and reactor 16 now becomes resonant again and the cycle is repeated, lamps 4, 5, and 6 successively being illuminated and extinguished at regular recurring intervals so that there is produced the effect of successive waves of illumination and darkness traveling along the series of lamps 4, 5, and 6, the number of which obviously may be increased without limit.

Since the saturating winding 25 is connected across lamp 6 through rectifier 18, when this lamp increases in brilliancy the impedance of winding 21 in circuit 20 decreases causing an increase in the pulsation frequency of circuit 20 and also an increase in the amplitude of the pulsations therein. Likewise when lamp 6 is extinguished less saturated current is supplied to reactor 22 and the resulting increase in impedance of winding 21 causes a decrease in both the frequency and amplitude of the pulsations in circuit 20. The final effect on lamp 24 is that when the illumination of lamp 6 increases lamp 24 is illuminated intermittently, the frequency of the illuminations and the intensity thereof both increasing as the brilliancy of lamp 6 increases. Likewise as the illumination of lamp 6 decreases the illumination pulses of lamp 24 decrease both as to the frequency and as to the intensity.

For the sake of simplicity I have shown the saturable core reactors 10 in a purely diagrammatic manner. Their actual construction may, for example, be as shown in Fig. 2 where the core of reactor 10 has four legs, the alternating current winding of which comprises the coils 27 and 28 wound in opposite directions on the two inner legs of the core and connected in parallel in the alternating current branch circuit and where the saturating winding 11 which comprises the single coil 29 surrounds both of said legs. A reactor of this type is disclosed in the Alexanderson Patent 1,328,610, January 20, 1920. Instead of a single core reactor I may employ two separate transformers 30 and 31 as shown diagrammatically in Fig. 3. These transformers respectively have saturating windings 32 and 33 which are shown connected in series and alternating current windings 34 and 35 shown connected in parallel. Windings 34 and 35 are shown reversed in order to prevent alternating current from being introduced in the direct current circuit.

I have chosen the particular embodiment described above as illustrative of my invention, and it will be apparent that various modifications may be made without departing from the spirit and scope of my invention, which modifications I aim to cover by the appended claims.

What I claim as new and desire to secure by Letters Patent in the United States is:

1. In combination, a load circuit and a non-linear pulsation circuit arranged for connection with an alternating current supply circuit, and means responsive to variations in the effective value of the current in the load circuit for varying the pulsation frequency of the pulsation circuit.

2. In combination, a load circuit including current controlling means and a non-linear pulsation circuit arranged for connection with an alternating current supply circuit and means responsive to variations in the effective value of the current in said load circuit for varying the frequency of pulsation of said pulsation circuit.

3. In combination, a load circuit and a non-linear pulsation circuit arranged for connection with an alternating current supply circuit, and means responsive to variations in the effective value of the current in the load circuit for varying the amplitude of the pulsations in said pulsation circuit.

4. In combination, a load circuit and a non-linear pulsation circuit arranged for connection with an alternating current supply circuit, and means including a saturable core reactor in said pulsation circuit for varying the pulsation frequency in response to current variations in said load circuit.

5. In combination, a load circuit and a non-linear pulsation circuit arranged for connection with an alternating current supply circuit, means for producing regular recurring variations in the effective value of the current in said load circuit and means responsive to said current value for varying the pulsation frequency and the pulsation amplitude in said pulsation circuit.

6. In combination, an alternating current supply circuit, a load circuit connected to be energized therefrom, means for producing regular recurring variations in the effective value of the current in the load circuit, a non-linear pulsation circuit connected to be energized from said supply circuit and means comprising a saturable core reactor for varying the amplitude and pulsation frequency in the pulsation circuit in response to the current variations in the load circuit.

7. In combination, a non-linear pulsation circuit arranged for connection with a source of alternating current supply and including a saturable core reactor and means for varying the degree of saturation of said core.

8. In combination, a non-linear pulsation circuit arranged for connection with a source of alternating current supply and including a reactor having a core and means for variably saturating said core.

9. In combination, an alternating current supply circuit, a plurality of branch circuits connected therewith each including a load device, means for causing the load devices to operate in sequence, a non-linear pulsation circuit connected with said supply circuit and including a load device, and means responsive to the current in one of the branch circuits for varying the pulsation frequency and amplitude in the non-linear circuit.

10. The method of varying the pulsation frequency in a pulsating non-linear resonant circuit including a reactor, a capacitor and a source of alternating current which comprises varying the value of the reactance of said reactor.

11. The method of varying the pulsation amplitude in a pulsating non-linear resonant circuit including a reactor, a capacitor and a source of alternating current which comprises varying the value of the reactance of said reactor.

CHAUNCEY G. SUITS.